(12) United States Patent
Haba et al.

(10) Patent No.: US 8,528,256 B2
(45) Date of Patent: Sep. 10, 2013

(54) SAFETY DEVICE FOR A MOVABLE BARRIER

(75) Inventors: Charles A. Haba, Massillon, OH (US); Shawn P. Leech, Dover, OH (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 13/100,842

(22) Filed: May 4, 2011

(65) Prior Publication Data

US 2012/0279131 A1 Nov. 8, 2012

(51) Int. Cl.
*E05D 13/00* (2006.01)
*E05F 3/00* (2006.01)

(52) U.S. Cl.
USPC ............................................... 49/322

(58) Field of Classification Search
USPC ............... 49/322; 187/371; 188/31, 68, 69, 188/72.7; 16/90, 91, 198
See application file for complete search history.

(56) References Cited

U.S. PATENT DOCUMENTS

| | | | |
|---|---|---|---|
| 3,188,698 A * | 6/1965 | Zoll et al. ...................... | 49/322 |
| 4,520,591 A | 6/1985 | Calvagno | |
| 5,291,686 A * | 3/1994 | Sears et al. ....................... | 49/322 |
| 5,931,263 A * | 8/1999 | Ericson et al. ................ | 187/373 |
| 6,042,158 A * | 3/2000 | Horn .............................. | 292/165 |
| 6,189,266 B1 | 2/2001 | Mihalcheon | |
| 6,279,268 B1 * | 8/2001 | Beaudoin et al. ............... | 49/322 |
| 6,553,716 B2 * | 4/2003 | Bruns ............................. | 49/322 |
| 6,640,496 B2 | 11/2003 | Mullet | |
| 6,715,236 B2 | 4/2004 | Mullet | |
| 6,862,845 B2 | 3/2005 | Schiks | |
| 7,000,354 B2 | 2/2006 | Beaudoin et al. | |
| 7,097,003 B2 * | 8/2006 | Reynolds et al. ............. | 187/351 |
| 7,484,332 B2 * | 2/2009 | Hormann et al. ............... | 49/322 |
| 7,600,344 B2 * | 10/2009 | Michaud ......................... | 49/322 |
| 2003/0051409 A1 * | 3/2003 | Bruns ............................. | 49/322 |
| 2007/0204515 A1 * | 9/2007 | Barriault et al. ................ | 49/322 |

* cited by examiner

*Primary Examiner* — Katherine Mitchell
*Assistant Examiner* — Scott Denion
(74) *Attorney, Agent, or Firm* — Gardere Wynne Sewell LLP

(57) ABSTRACT

A safety device is provided for an upward acting door supported by a support cable, the door being movable along a pair of parallel tracks between an open position and a closed position. The safety device includes a brake pad mechanism disposed within at least one of the parallel tracks and coupleable to the door, the brake pad mechanism operable between a released position, to enable movement of the door as the door is positioned between the open and closed positions, and a braking position, to resist movement of the door. The support cable is coupled to the release mechanism such that in the event of a loss of tension of the support cable, the release mechanism actuates from the released position to the braking position to resist movement of the door.

5 Claims, 4 Drawing Sheets

SAFETY DEVICE FOR A MOVABLE BARRIER

BACKGROUND

Barrier operator systems of the type including a barrier operator and associated drive assembly for opening and closing sectional garage doors typically also use a counterbalance assembly to provide additional force to assist in the raising of the door and to effect control over the lowering of the door. This assembly conventionally includes a large compression spring for providing the necessary force and a pair of spaced support cables that are attached at one end to the counterbalance spring shaft and at the other end at the bottom of the door. After extended periods of use and/or in instances where the garage door is operated without any preventative maintenance, different portions of the counterbalance assembly can be susceptible to wearing out or breaking, and in some circumstances potentially create unintended movement of the door unless this potential is adequately addressed. For example, this could potentially occur if one or the other of the two support cables snap while the door is closing, due to the then uncounterbalanced weight of the door. In such event, a method of resisting unintended movement of the door can provide additional safety for people and property in the vicinity of the opening.

Many solutions have heretofore been developed to attempt to address this problem. Many of the devices designed to prevent door movement are bulky, difficult to install, costly, not easily retrofitted onto an existing door, or otherwise not satisfactory in their operation for many conditions of service. A need therefore has existed for a new and improved safety device to protect against unintended movement of the door in the event of the breaking of, or damage to, the counterbalance assembly or significant portions thereof.

SUMMARY

Accordingly, the embodiments of the safety device disclosed herein provide a method, in accordance with the principles of the present invention, for substantially compensating for, if not entirely eliminating, the adverse effects of a break in one or both of the support cables affixed to the garage door. The safety device of the present invention preferably includes a main body member adapted for disposition within the confines of one of the parallel door tracks along which the garage door is driven, and coupled to the door so as to travel with it as the door is moved between its open and closed positions. The safety device further includes a brake pad mechanism coupled to a support cable and operable to move one or more brake pads between a retracted position out of engagement with the door track, during normal door operation, and a braking position, in which the brake pads are in frictional engagement with the track, in response to the support cable breaking or otherwise becoming slack. The safety device, through this frictional engagement, thus aids in preventing, or significantly slowing, any unintended movement of the door. If desired, a safety device of the aforestated construction and positioning may be respectively disposed in each of the opposed door tracks.

BRIEF DESCRIPTION OF THE DRAWINGS

Additional features of the safety device of the present invention, as well as its many advantages, will become readily apparent from the following detailed description of specific embodiments thereof, read in conjunction with the accompanying drawings, in which.

DETAILED DESCRIPTION

Figure 1:
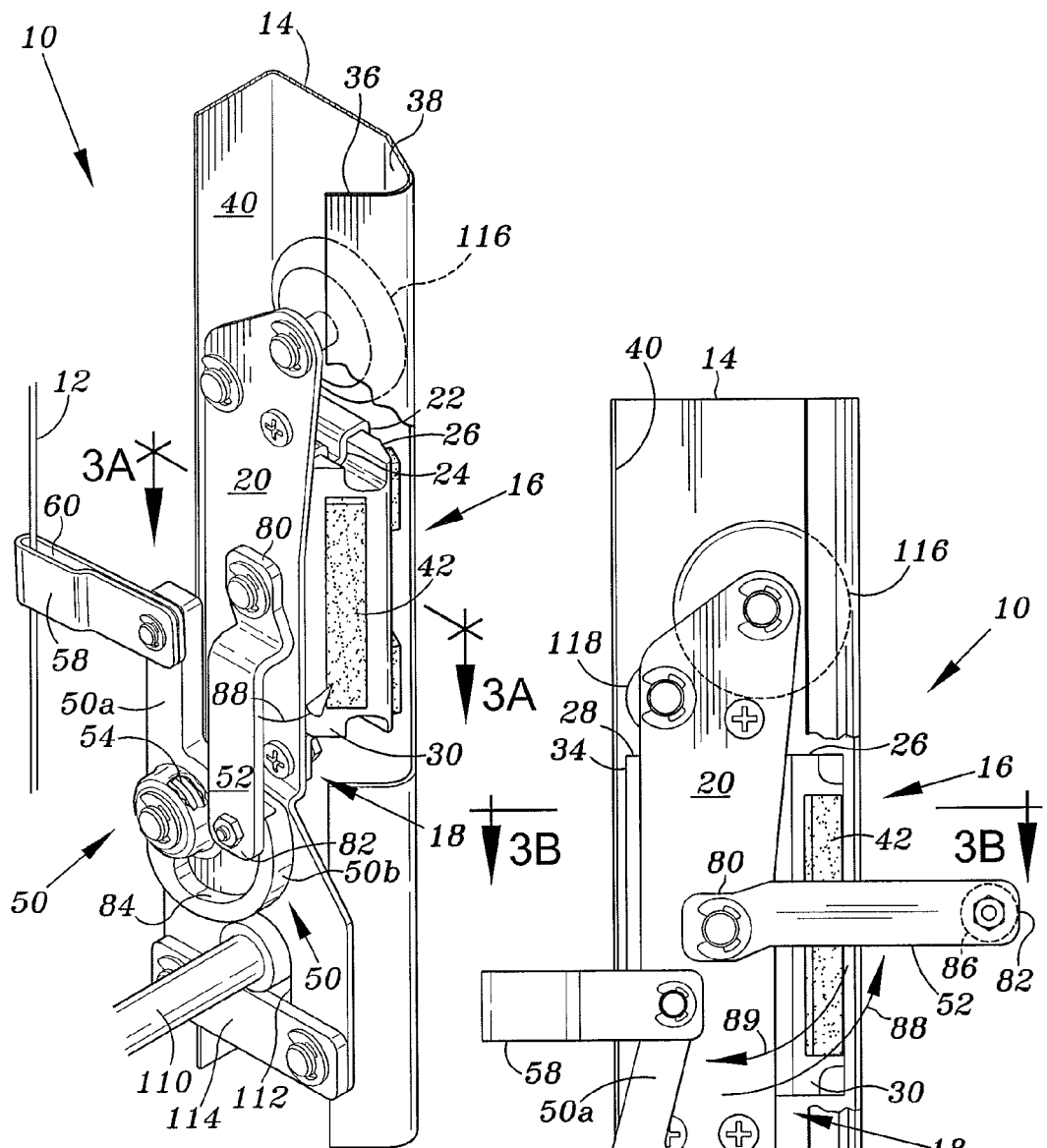
FIG. 1 is an illustration of the safety device of the present invention disposed within the confines of one of the two garage door tracks with the brake pad mechanism in its retracted position.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Referring initially to FIG. 1, a safety device 10 is illustrated such that, for example, in the event of a breaking or a loss of tension of a support cable 12, safety device 10 will reduce or substantially eliminate the possibility of unintended movement of the garage door. In particular, safety device 10 is disposed substantially within a parallel track member 14 and contains a brake pad mechanism 16, which is moved in response to loss of tension in support cable 12 to position one or more brake pads to frictionally engage track 14 to prevent the door from falling or, at least significantly slow the door's descent downward.

Referring to FIGS. 1-3B, brake pad mechanism 16 includes a main body member 18 having a front plate 20 and a rear plate 22 forming a support frame or slot 24 to slideably receive a pair of brake pad supports 26 and 28 therein. As seen specifically in FIGS. 3A and 3B, supports 26 and 28 each include generally planar surfaces 30, 32 and 34 and are angled so as to be generally parallel to inner surfaces 36, 38 and 40, respectively, of track 14. Planar surfaces 30, 32 and 34 are sufficiently sized to support brake pads 42, 44 and 46 thereon such that when brake pad mechanism 16 is triggered, supports 26 and 28 are pushed outward to a braking position so that brake pads 42, 44 and 46 frictionally engage surfaces 36, 38 and 40 (FIG. 4B) to stop or slow further downward movement of the door. Alternatively, planar surfaces 30, 32 and 34 can be formed of a material to directly frictionally engage surfaces 36, 38 and 40 such that brake pads 42, 44 and 46 are not necessary.

In operation, brake pad mechanism 16 is moved from a retracted position (i.e., when brake pads 42, 44 and 46 are spaced apart from inner surfaces 36, 38 and 40) to the braking position in response to movement of a tensioning arm 50, which is rotatably mounted to front plate 20. In particular, a biasing mechanism 54 biases tensioning arm 50 to rotate in the direction of arrow 56 (FIG. 2) to facilitate the disengagement of a reset link 52 from tensioning arm 50. This disengagement between tensioning arm 50 and link 52 enables link 52 to rotate upward in the direction of arrow 88 to, as explained in further detail below, cause movement of brake pad supports 26 and 28, and thus, brake pads 42, 44 and 46, to the braking position.

Referring specifically to FIG. 1, tensioning arm 50 is interfaced with support cable 12 via a cable follower 58, which is positioned to receive support cable 12 through an opening 60 formed on cable follower 58. After inserting support cable 12 through opening 60 and applying tension to support cable 12, tensioning arm 50 rotates in the direction of arrow 57 until arm 50, and in particular, arm extension 50a, is generally in the vertical position (i.e., generally parallel to track 14). When positioned as such, tensioning arm 50 holds or otherwise prevents the release of reset link 52 from within a curvilinear slot 84, which is disposed on a base section 50b of tensioning arm 50.

Figure 2:
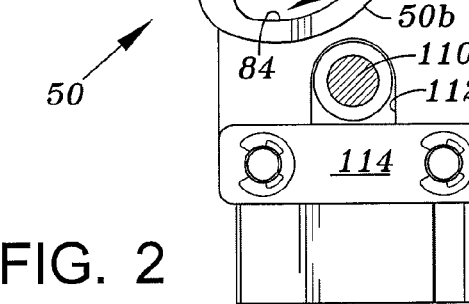
FIG. 2 is an illustration of the safety device of FIG. 1 with the brake pad mechanism in its braking position.
Figure 3A:
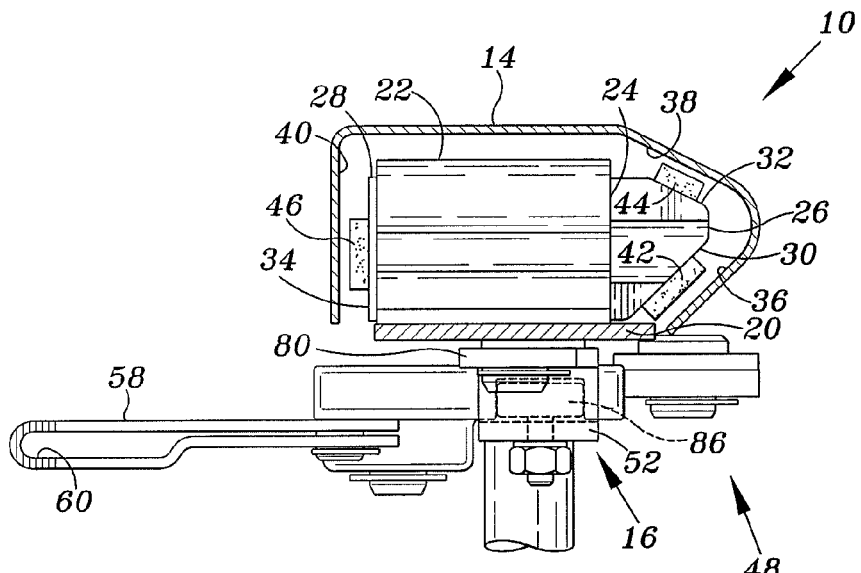
FIG. 3A is a section view taken along the line 3A-3A of FIG. 1.
Figure 3B:
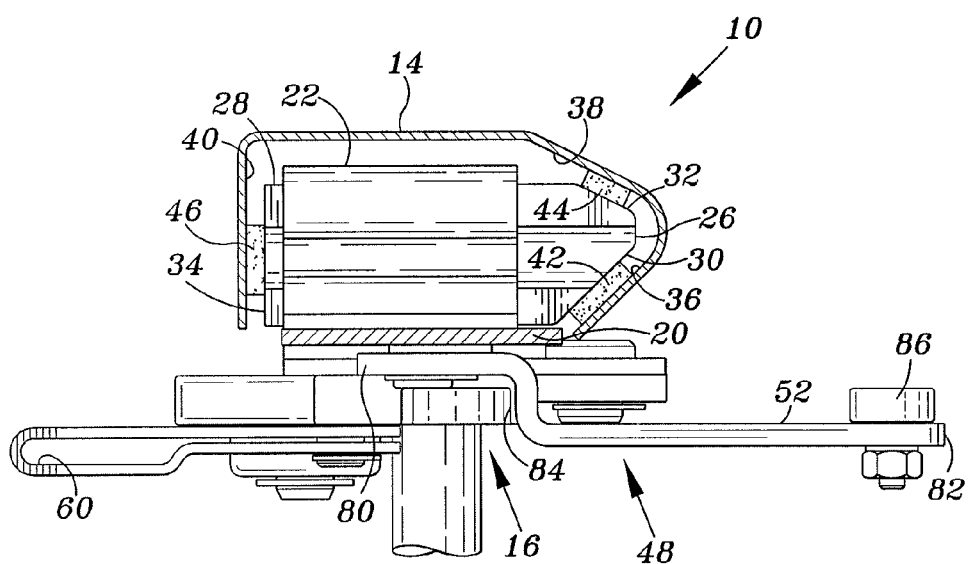
FIG. 3B is a section view taken along the line 3B-3B of FIG. 2.
Figures 4A, 4B:
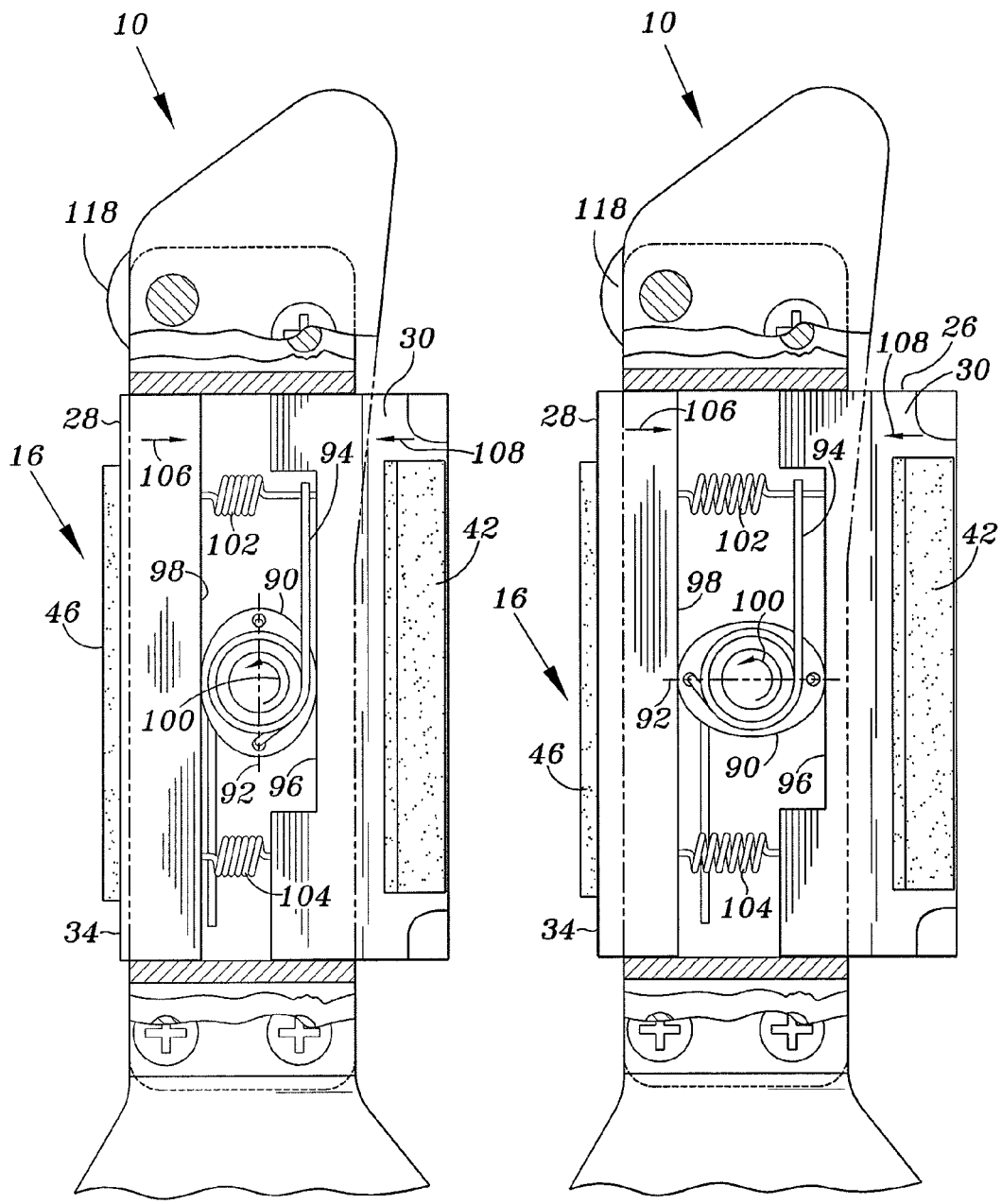
FIG. 4A is a side view of a portion of the safety device illustrating a spring biased cam configured to position the brake pad mechanism in its retracted position.
FIG. 4B is a side view of a portion of the safety device illustrating the spring biased cam positioned such that the brake pad mechanism advances the brake pads to frictionally engage the door track in its braking position.

As illustrated in FIGS. 1 and 2, reset link 52 includes a first end 80 pivotably coupled to front plate 20 and a second end 82 having a cam follower 86 movable within curvilinear slot 84 (FIG. 2). In operation, if tension in support cable 12 is lost, biasing mechanism 54 releases its stored energy to rotate tensioning arm 50 in the direction of arrow 56, which in turn releases or otherwise allows the disengagement of second end 82 of reset link 52 from curvilinear slot 84. Once disengaged, reset link 52 is biased to rotate in the direction of arrow 88 (FIG. 2), which in turn rotates a cam 90 (FIGS. 4A and 4B). As cam 90, which is fixedly secured to reset link 52, rotates, brake pad supports 26 and 28 are outwardly positioned to enable brake pads 42, 44 and 46 to frictionally engage track inner surfaces 36, 38 and 40.

In FIGS. 4A and 4B, cam 90 is disposed between brake pad supports 26 and 28 and is preferably oval shaped having a major axis 92, the cam 90 movable between a vertically oriented position (FIG. 4A, where major axis 92 is vertically oriented) to a generally horizontally oriented position (FIG. 4B, where major axis 92 is horizontally oriented). Movement of cam 90 from the vertically oriented position to the horizontally oriented position causes brake pad supports 26 and 28 and thus, brake pads 42, 44 and 46, to contact inner surfaces 36, 38 and 40, respectively, of track 14. A biasing mechanism 94 biases cam 90 toward the horizontally oriented position to configure and/or otherwise exert an outward force on surfaces 96 and 98 of supports 26 and 28. Thus, as reset link 52 is released from curvilinear slot 84 (as a result of tension loss of support cable 12), biasing mechanism 94 releases its stored energy to rotate cam 90 (and thus reset link 52) to the horizontal oriented position thereby moving supports 26 and 28 and thus, brake pads 42, 44 and 46, to the braking position.

Brake pad mechanism 16 is easily positionable to the retracted position after, for example, actuation of brake pad mechanism 16, without the use of tools or requiring that any component of track 12 and/or release mechanism 16 be replaced. For example, when configuring brake pad mechanism 16 from the braking position to the retracted position, reset link 52 is manually moved in the direction of arrow 89 (FIG. 2), thereby causing rotation of cam 90 in the direction of arrow 100 (FIG. 4A) and storage of potential energy in biasing mechanism 94. This movement continues until reset link 52 and cam 90 are both generally vertically oriented. During this movement and as particularly illustrated in FIGS. 4A and 4B, a pair of tensioned return springs 102 and 104 retract supports 26 and 28 inward in the direction of arrows 106 and 108 to maintain contact with the outer surface of cam 90. As reset link 52 reaches its vertical orientation, tensioning arm 50 is manually rotated/oriented such that curvilinear slot 84 will be configured to receive cam follower 86 therein (FIG. 2). Tension is applied to support cable 12 so as to resist substantial movement of tensioning arm 50, which prevents the release of reset link 52 from curvilinear slot 84 and maintains brake pad mechanism 16 in the retracted position.

Figures 5, 6:
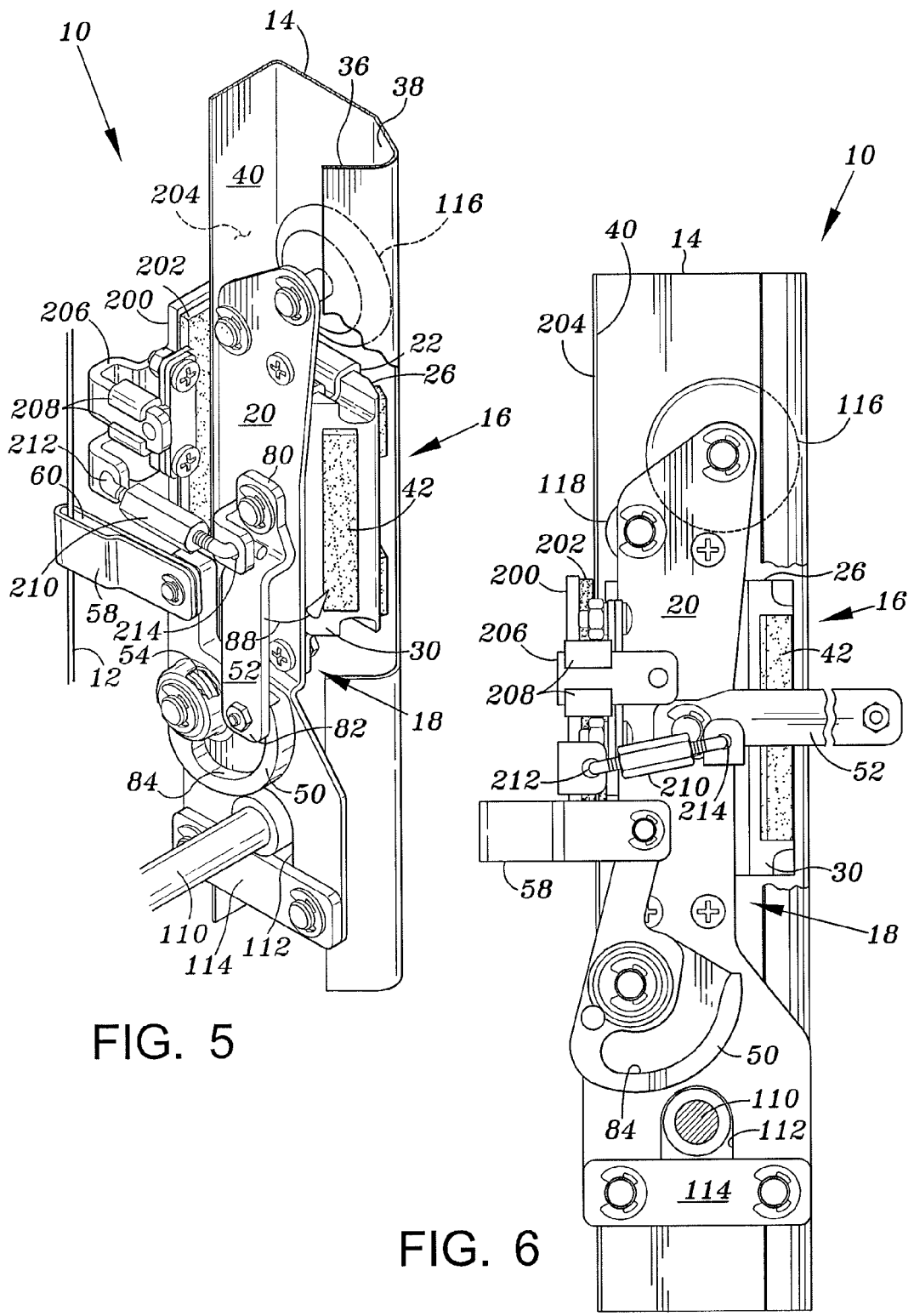
FIG. 5 is an illustration of an alternate embodiment of the safety device of the present invention having an external brake pad.
FIG. 6 is a side view of the safety device of FIG. 5 in its braking position.

Referring to FIGS. 5 and 6, safety device 10 optionally includes an external brake pad support 200 having a brake pad 202 to frictionally engage an outer surface 204 of track 14 in response to actuation and movement of brake pad mechanism 16 to the braking position. Preferably, brake pad support member 200 is used with heavier garage doors to provide additional frictional contact between brake pad 202 and track 14 and thus, additional braking support for the garage door to prevent the door from falling, or at least slow its descent in the event of a break in support cable 12, resulting in a loss of tension of support cable 10.

In FIGS. 5 and 6, a guide arm 206 extends from brake pad support 200 and is aligned with, supported on, and otherwise movable with respect to a stationary guide 208. A coupler 210 extends between guide arm 206 and reset link 52 such that as reset link 52 is released from tensioning arm 50 and rotates in the direction of arrow 88, brake pad supports 26 and 28 frictionally engage internal surfaces 36, 38 and 40, and brake pad support 200 (and thus brake pad 202) is pulled toward outer surface 204 to enable brake pad 202 frictionally engages surface 204 (FIG. 6). In the embodiment illustrated in FIGS. 5 and 6, coupler 210 comprises right and left hand threads for engagement with threaded rods 212 and 214, which are used to connect coupler 210 to guide arm 206 and reset link 52 and also to facilitate the adjustment of the position of brake pad 202 relative to surface 204 when brake pad mechanism 16 is in the retracted position.

Preferably, safety device 10 is substantially disposed within at least one of the parallel track members 14; however, it should be understood that a safety device 10 could be disposed within each of the parallel track members 14. Referring back to FIGS. 1 and 2, safety device is mounted on a roller shaft 110 adjacent to a bottommost garage door panel (not illustrated). Front plate 20 contains a slot or recessed portion 112 to receive roller shaft 110, which supports a door roller on the garage door. Roller shaft 110 is inserted within recess 112 and locked therein via a locking plate 114, which is coupled to and disposed along the bottom portion of front plate 20. It should be understood that other methods of coupling roller shaft 110 to safety device can be used, such as, for example, frictionally engaging roller shaft 110 within recess 112. Safety device 10 is further supported and/or otherwise balanced within track 14 by a pair of roller guides 116 and 118. In the embodiment illustrated in FIGS. 1 and 2, roller guide 116 is mounted on front plate 20 on an end opposite recessed portion 112 and roller guide 118 is disposed intermediate roller guide 116 and roller shaft 110. Roller guides 116 and 118 and the garage door roller mounted on roller shaft 110 all function to stabilize safety device 10 within track 14.

Embodiments disclosed herein provide for a safety device 10 that can potentially be installed onto many existing or previously installed garage doors. For example, instead of attaching system 10 directly to a garage door at the factory, safety device 10 can be aligned within track 14 and coupled to roller shaft 110 during installation of the garage door in the field and/or retrofitted to an already existing garage door. In addition, safety device 10 can be easily removed from track 14 without damage thereto and/or damage to the garage door.

Embodiments disclosed herein also provide a brake pad mechanism 16 designed to be operable even after engaging track 14 without necessitating the replacement any of the components of brake pad mechanism 16 and/or track 14. Thus, brake pad mechanism 16 is easily resettable for repeated use. For example, brake pads 42, 44, 46 and 202 can be formed of a material and desired thickness to withstand multiple engagements with track 14. If, after repeated use, it becomes necessary to replace worn or unusable brake pads 42, 44, 46 and/or 202, the brake pads are removed from brake pad supports 26 and 28 and replaced with new brake pads 42, 44 and 46 so that brake release mechanism 16 remains operable.

Safety device 10 is operable to prevent accidental actuations that could occur as the garage door moves to the fully open position. In particular, sometimes slack in support cable 12 can potentially develop as the garage door and thus, safety device 10, travels along the curved portion of track 14 (i.e., the portion that connects the horizontal and vertical track sections). In order to accommodate for such periods of slack and thus prevent false actuations of brake pad mechanism 16, tensioning arm 50 rotates or otherwise adjusts in response to small variations of tension in support cable 10. In particular, the curvature of curvilinear slot 84 enables cam follower 86 to move within slot 84 to accommodate slight angular displacements of tensioning arm 50 resulting from tension variations without releasing reset link 52 from slot 84. However, if the slack in support cable 12 rises above a predetermined threshold (i.e., more than what typically occurs during movement of the door or when the door approaches the raised position), tensioning arm 50 will continue to rotate until reset link 52 exits slot 84, thereby actuating brake pad mechanism 16.

Although embodiments of cable failure device 10 have been described in detail, those skilled in the art will also recognize that various substitutions and modifications may be made without departing from the scope and spirit of the appended claims.

What is claimed is:

1. A brake pad mechanism for an upward acting door, the door disposed between a pair of parallel tracks, the tracks having a vertical portion connected to a horizontal portion by curved portion, the door movable along the tracks between the open and closed positions, the brake pad mechanism comprising:

a main body member coupled to the movable barrier, the main body member having a slot to receive a first and second brake pad support disposed within and engageable with at least one of the parallel tracks, wherein the first brake pad support moves away from the second brake pad support when moving to a braking position;

a reset link engageable with a biased tensioning arm to position the first and second brake pad supports in a retracted position;

a cable follower secured to the tensioning arm, the cable follower configured to receive a support cable; and wherein the tensioning arm is pivotable in response to movement of the door along the curved portion such that the reset link maintains engagement with the tensioning arm as the door travels along the curved portion to the open position; and wherein the tensioning arm further includes a curvilinear slot to receive a cam follower disposed on a lateral end of the reset link opposite a first biased connection of the reset link to the main body member, wherein the curvilinear slot at least partially encircles a second biased connection between the tensioning arm and the main body member, the cam follower movable within the curvilinear slot in response to movement of the tensioning arm.

2. The brake pad mechanism of claim 1, wherein the reset link is coupled to and movable with a cam so that when the reset link disengages from the tensioning arm, the reset link and cam are biased to move the first and second brake pad supports to the braking position.

3. The brake pad mechanism of claim 1, further comprising a third brake pad support having a brake pad engageable to at least one of the parallel tracks.

4. The brake pad mechanism of claim 1, wherein the support cable is coupled to the cable follower to maintain the brake pad mechanism in a retracted position.

5. The brake pad mechanism of claim 1, wherein the brake pad mechanism is resettable without replacing any components thereof.

* * * * *